(12) United States Patent
Chang et al.

(10) Patent No.: US 12,478,909 B2
(45) Date of Patent: Nov. 25, 2025

(54) COALESCING FILTER ELEMENT

(71) Applicant: China University of Petroleum-Beijing, Beijing (CN)

(72) Inventors: Cheng Chang, Beijing (CN); Zhongli Ji, Beijing (CN); Xiaolin Wu, Beijing (CN); Zhen Liu, Beijing (CN); Feng Chen, Beijing (CN)

(73) Assignee: China University of Petroleum-Beijing, Beijing (CN)

( * ) Notice: Subject to any disclaimer, the term of this patent is extended or adjusted under 35 U.S.C. 154(b) by 417 days.

(21) Appl. No.: 18/153,094

(22) Filed: Jan. 11, 2023

(65) Prior Publication Data
US 2023/0158434 A1    May 25, 2023

Related U.S. Application Data

(63) Continuation of application No. PCT/CN2021/098053, filed on Jun. 3, 2021.

(30) Foreign Application Priority Data

Mar. 18, 2021    (CN) .......................... 202110289457.9

(51) Int. Cl.
*B01D 46/00*    (2022.01)
*B01D 46/24*    (2006.01)
(Continued)

(52) U.S. Cl.
CPC ......... *B01D 46/0031* (2013.01); *B01D 46/24* (2013.01); *B01D 53/266* (2013.01);
(Continued)

(58) Field of Classification Search
None
See application file for complete search history.

(56) References Cited

U.S. PATENT DOCUMENTS 3,347,026 A    10/1967    Zankey
6,235,192 B1    5/2001    Melfi et al.
(Continued)

FOREIGN PATENT DOCUMENTS

AU          480617 A    1/1975
CA        1206889 A    7/1986
(Continued)

OTHER PUBLICATIONS

CN103463894A_ENG (Google machine translation of Fu) (Year: 2013).*

(Continued)

*Primary Examiner* — Gabriel E Gitman
(74) *Attorney, Agent, or Firm* — Young Basile Hanlon & MacFarlane, P.C.

(57) ABSTRACT

A coalescing filter element, including an inner coalescing component configured to captured a large amount of liquid in gas, and an outer coalescing component configured to coalesce and filter a small amount of liquid remaining in the gas. The inner coalescing component and the outer coalescing component are cylindrical structures disposed in a vertical direction and opened at two ends. The outer coalescing component is sleeved on an outer side of the inner coalescing component, and an annular drainage space is formed between the inner coalescing component and the outer coalescing component. A top end cap is provided on top ends of the inner coalescing component and the outer coalescing component. A bottom end cap is provided on bottom ends of the inner coalescing component and the outer coalescing component. The bottom end cap is provided with a gas inlet communicated with an interior of the inner coalescing component.

11 Claims, 8 Drawing Sheets

(51) Int. Cl.
*B01D 53/26* (2006.01)
*B01D 46/64* (2022.01)

(52) U.S. Cl.
CPC .......... *B01D 46/64* (2022.01); *B01D 2265/06* (2013.01); *B01D 2275/10* (2013.01)

(56) References Cited

U.S. PATENT DOCUMENTS

| | | | |
|---|---|---|---|
| 6,627,166 | B1 | 9/2003 | Simon |
| 8,512,429 | B2 * | 8/2013 | Barratt .................... B01D 46/64 55/423 |
| 10,464,005 | B2 * | 11/2019 | Tanaka ................. B01D 46/521 |
| 2013/0291499 | A1 * | 11/2013 | Gardner ............. B01D 46/2411 55/423 |
| 2015/0343363 | A1 * | 12/2015 | Schlichter ............ B01D 46/003 55/323 |
| 2016/0296856 | A1 | 10/2016 | Bultinck et al. |
| 2017/0028330 | A1 | 2/2017 | Dawar et al. |
| 2018/0085702 | A1 | 3/2018 | Adams et al. |
| 2019/0151775 | A1 * | 5/2019 | Schuster ................ B01D 17/10 |
| 2020/0155991 | A1 * | 5/2020 | Goris ................ B01D 46/0031 |

FOREIGN PATENT DOCUMENTS

| | | | | |
|---|---|---|---|---|
| CA | 2145394 | A1 | | 4/1994 |
| CN | 1671464 | A | | 9/2005 |
| CN | 101267871 | A | | 9/2008 |
| CN | 201454299 | U | | 5/2010 |
| CN | 201524499 | U | | 7/2010 |
| CN | 102596862 | A | | 7/2012 |
| CN | 103007647 | A | | 4/2013 |
| CN | 103203143 | A | | 7/2013 |
| CN | 103463894 | A | * | 12/2013 |
| CN | 104324579 | A | | 2/2015 |
| CN | 104383755 | A | | 3/2015 |
| CN | 104524840 | A | | 4/2015 |
| CN | 105451856 | A | | 3/2016 |
| CN | 105771477 | A | | 7/2016 |
| CN | 105935526 | A | | 9/2016 |
| CN | 106194149 | A | | 12/2016 |
| CN | 107051016 | A | | 8/2017 |
| CN | 206652345 | U | | 11/2017 |
| CN | 207401256 | U | | 5/2018 |
| CN | 108641767 | A | | 10/2018 |
| CN | 208632475 | U | | 3/2019 |
| CN | 109758850 | A | | 5/2019 |
| CN | 109847490 | A | | 6/2019 |
| CN | 110420517 | A | * | 11/2019 ......... B01D 46/0002 |
| CN | 110917749 | A | | 3/2020 |
| CN | 111003748 | A | | 4/2020 |
| CN | 210448403 | U | | 5/2020 |
| CN | 111389129 | A | | 7/2020 |
| CN | 211753192 | U | | 10/2020 |
| DE | 102010034787 | A1 | | 3/2011 |
| EP | 0913183 | A1 | | 5/1999 |
| EP | 2700438 | A1 | * | 2/2014 ......... B01D 46/0031 |
| JP | 2005349558 | A | | 12/2005 |

OTHER PUBLICATIONS

EP2700438A1_ENG (Espacenet machine translation of Gruber) (Year: 2014).*
CN110420517A_ENG (Espacenet machine translation of Chang) (Year: 2019).*
International Search Report for Application No. PCT/CN2021/098053, dated Dec. 8, 2021, 3 pgs.
Chinese First Office Action for Application No. 202110289457.9, dated Oct. 18, 2021, with English translation, 12 pgs.
Chinese Supplementary Search Report for Application No. 202110289457.9, dated Feb. 20, 2022, with English translation, 7 pgs.
Chinese Novelty Search Report for Application No. 202110289457.9, dated Mar. 22, 2021, with English translation, 10 pgs.

* cited by examiner

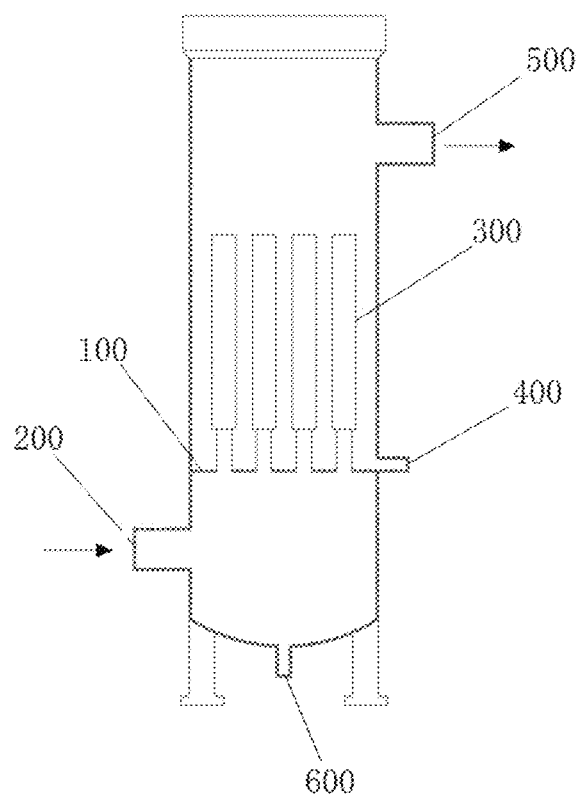
FIG. 1 --Prior Art--

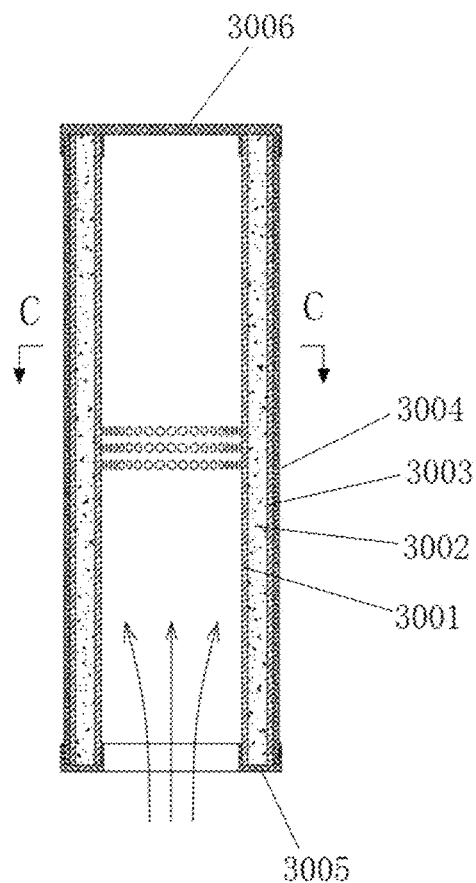
FIG. 2 --Prior Art--
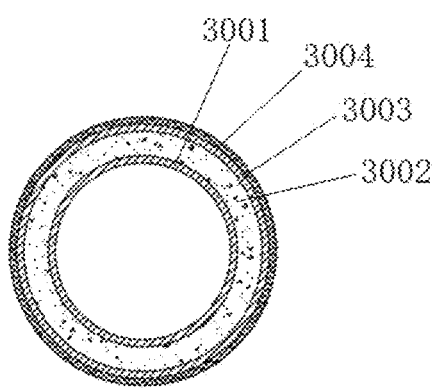
FIG. 3 --Prior Art--

COALESCING FILTER ELEMENT

CROSS-REFERENCE TO RELATED APPLICATIONS

This application is a continuation of International Application No. PCT/CN2021/098053, filed on Jun. 3, 2021, which claims priority to Chinese Patent Application NO. 202110289457.9, filed on Mar. 18, 2021, entitled 'coalescing filter element with drain function', all of which are hereby incorporated by reference in their entireties.

FIELD

The present disclosure relates to a technical field of natural gas transportation, and particularly to a coalescing filter element.

BACKGROUND

Pipeline transportation in natural gas transportation technology is the optimum way to realize a long-distance transmission of a large amount of oil and gas resources. To realize long-distance transportation, it is necessary to provide compressor stations along the pipeline to pressurize natural gas. The core power equipment of the compressor station is a compressor. Natural gas extracted from the ground usually contains some minerals, clay, water, condensate, or other impurities. If solid particles or droplets enter the compressor, the blade or dry gas seal system of the compressor will be worn, corroded, or thermally strained, which may cause the compressor to shut down in severe cases.

Generally, the natural gas entering the compressor station passes through devices such as a cyclone separator, a filter separator, and a coalescer in sequence to remove the solid and liquid impurities entrained in the gas, so as to ensure continuous and normal operation of the compressor for an extended period. The coalescer is mainly used to remove droplets with a diameter of less than 1 μm. The core component of the coalescer is coalescing filter elements.

The structure of the coalescer in the prior art is illustrated in FIG. 1. The coalescer is internally provided with a tube sheet 100, which divides an interior of the coalescer into an upper portion and a lower portion. The lower portion is a liquid-containing gas chamber and the upper portion is a filtered gas chamber. The gas with droplets enters the liquid-containing gas chamber through an inlet 200 of the coalescer, then passes to the inner side of each coalescing filter element 300 through an opening at the bottom of the coalescing filter element 300 by the gas driving force, and then flows into the coalescing filter element 300 through pores of the filter material in the inner surface of the coalescing filter element 300. After being coalesced, where tiny droplets in the gas collide, coalesce, and merge into larger droplets inside the filter material of the coalescing filter element 300, the coalesced liquid drains through the outer surface of the coalescing filter element 300. The drained liquid falls on the tube sheet 100 by gravity, and then drains from the coalescer through a first liquid vent 400 at the lower portion of the filtered gas chamber. The filtered gas flows through the outer surface of the coalescing filter element 300, and then exits to the downstream process through an outlet 500 at the upper portion of the clean gas chamber. If the liquid content in the gas is extremely high, part of the liquid will be directly captured on the inner surface of the coalescing filter element 300, then fall to the bottom of the liquid-containing gas chamber by gravity, and then drained from the coalescer through a second liquid vent 600 at the bottom of the liquid-containing gas chamber.

The structure of the coalescing filter element 300 in the prior art is illustrated in FIGS. 2 and 3. An inner support 3001 serves as a support for the coalescing filter element 300. A coalescing layer 3002, which is composed of multi-layer fibrous filter media for coalescing droplets and usually made up of glass fibers, is wrapped outside the inner support 3001. An outer support 3003 is provided outside the coalescing layer 3002 to fix it. A drainage layer 3004 is wrapped outside the outer support 3003. The drainage layer 3004, which is composed of a single-layer fibrous filter medium for draining coalesced liquid, is capable of capturing large droplets caused by droplet re-entrainment from the coalescing layer 3002. The drainage layer 3004 is usually made up of polymer fibers such as aramid fibers and is assembled outside the filter element. A bottom end cap 3005 and a top end cap 3006 of the filter element are connected with the drainage layer 3004 to seal both ends of the inner support 3001, the coalescing layer 3002, the outer support 3003, and the drainage layer 3004, so that the gas with liquid and solid contaminants can only pass through the coalescing filter element 300 in the radial direction, where the coalescence and filtration are completed efficiently during this process.

However, the above-mentioned coalescing filter element usually has the following disadvantages during the operation.

1. The coalescing layer of the coalescing filter element in the prior art is formed by tightly wrapping or pleating multiple layers of high-efficiency fiber media. In the coalescence and filtration process, a large amount of liquid is captured by the fiber materials and clogs the pores thereof, resulting in a gradual reduction in the filtration efficiency.

2. In the filtration process, the captured liquid moves to the outside of the filter element and forms a liquid film on the outer surface of the coalescing layer of the filter element. The liquid film will lead to a sudden increase in the pressure drop of the filter element and a significant increase in the energy consumption of the system. Meanwhile, the gas passing through the liquid film will cause the liquid film to break and become many tiny droplets, resulting in a significant decrease in the gas-liquid separation performance.

3. The coalescing filter element is usually cylindrical, with a length of about 0.9 m to 1.8 m. The coalescing filter element is mounted vertically, which will lead to an uneven distribution of the liquid captured by the coalescing filter element in the vertical direction. As a result, the closer to the bottom of the filter element, the more serious a liquid blockage and droplet re-entrainment in the filter material is, which will seriously affect the filtration performance of the filter element. The droplet re-entrainment is a process in which the droplets that have been separated from the gas phase are entrained again by the gas due to the gas flow. In addition, when there is a large amount of liquid in the filter media at the bottom of the filter element, the liquid content in other filter media adjacent to the bottom will increase due to the capillary action, which further weakens the capture of droplets by fibers, resulting in a decrease in filtration efficiency.

The above situations particularly exist in the fields such as a compressor station of a long-distance natural gas transportation pipeline and an offshore oil and gas exploitation platform. When the operating condition fluctuates or the content of submicron droplets in the gas suddenly increases, the efficiency of the filter element will decrease and the energy consumption of the system will increase.

However, there is still no effective solution in the prior art to solve the problem that the filtration performance of the coalescing filter element does not meet the requirements and in which the pores can be easily clogged by the droplets.

SUMMARY

An objective of the present disclosure is to provide a coalescing filter element with double drainage layers, which includes an inner and an outer coalescence structures, and a drainage space therebetween. Liquid coalesced by the inner coalescing component enters the drainage space, which greatly reduces the amount of liquid to be coalesced by the outer coalescing component, thus effectively avoiding the weakening influence of excessive amount of liquid on the filtration performance of the outer coalescing component, and effectively prolonging service life of the filter element and reducing energy consumption.

Another objective of the present disclosure is to provide a coalescing filter element with double drainage layers, in which the inner support and the outer coalescing component are segmented structures, and filter media of the inner coalescing component are arranged with gradient pore diameters, which can effectively restrain a sudden rise of pressure drop in the inner coalescing component and realize a timely drainage of liquid captured by the inner coalescing component, and re-entrained droplets from the inner coalescing component will be fully captured by the outer coalescing component, thus significantly improving filtration efficiency of the filter element.

The above objectives of the present disclosure can be achieved by the following technical solutions.

The above objectives of the present disclosure can be achieved by the following technical solutions. It is one aspect of the present disclosure to provide a coalescing filter element with double drainage layers, including an inner coalescing component configured to capture a large amount of liquid in gas, and an outer coalescing component configured to coalesce and filter a small amount of liquid remaining in the gas, wherein the inner coalescing component and the outer coalescing component are cylindrical structures disposed in a vertical direction and opened at two ends; the outer coalescing component is sleeved on an outer side of the inner coalescing component, and an annular drainage space is formed between the inner coalescing component and the outer coalescing component; a top end cap is provided on top ends of the inner coalescing component and the outer coalescing component; a bottom end cap is provided on bottom ends of the inner coalescing component and the outer coalescing component, and the bottom end cap is provided with a gas inlet communicated with an interior of the inner coalescing component.

It is another aspect of the present disclosure to provide a coalescing filter element with double drainage layers, including an inner coalescing component and an outer coalescing component, wherein the inner coalescing component and the outer coalescing component are cylindrical structures disposed in a vertical direction; the outer coalescing component is sleeved on an outer side of the inner coalescing component, and an annular drainage space is formed between the inner coalescing component and the outer coalescing component; a top end of the inner coalescing component and a top end of the outer coalescing component are closed, a bottom end of the annular drainage space is closed, and a bottom end of an interior of the inner coalescing component is provided with a gas inlet.

The advantageous effects of the present disclosure are as follows.

1. The coalescing filter element with double drainage layers includes an inner coalescing component and an outer coalescing component. The inner coalescing component serves to capture a large amount of liquid in gas, and 80% to 90% of the liquid in the gas may be captured by the inner coalescing component, thus greatly reducing the amount of liquid to be coalesced and filtered by the outer coalescing component. In this case, the first outer coalescing layer of the outer coalescing component can be composed of high-efficiency filter media, resulting in high filtration efficiency and reduction in liquid clogging, by which more clean areas in the first outer coalescing layer are obtained for effectively capturing droplets for a long period of time. As a result, the service life of the filter element for highly efficient filtration can be prolonged at least 2 to 3 times compared to the coalescing filter element in the prior art, and the use cost can be greatly reduced. In addition, as the gas passes through the liquid film formed on the inner coalescing component, the droplets formed by the rupture of the liquid film will be captured by the outer first coalescing layer and be prevented from directly entering the downstream of the filter element.

2. In the coalescing filter element with double drainage layers, the first inner coalescing layer and the second inner coalescing layer are composed of different filter media with the same wettability, and pore diameters of the two kinds of filter media gradually increase from the inside to outside, so that the liquid can smoothly transport from the first inner coalescing layer towards the second inner coalescing layer. As there is no difference in wettability and no reduction in flow area, the liquid film will not form between the first inner coalescing layer and the second inner coalescing layer. The liquid film can only form on the outer surface of the filter medium with larger pore diameter (i.e., the second inner coalescing layer), thus effectively reducing the pressure drop in the coalescing filter element and ensuring normal use of the coalescing filter element.

3. In the coalescing filter element with double drainage layers, a lower portion of the first inner support is a blocking element without ventilation holes. Therefore, the liquid drained from the inner coalescing component can drop into the drainage space, or remain at a position in the lower portion of the inner coalescing layer with a same height as the blocking element. Therefore, the gas can smoothly pass through the upper portion of the inner coalescing component above the blocking element without directly impacting the liquid in the drainage space and the coalesced and filtered liquid in the lower portion of the inner coalescing layer, thus effectively reducing the droplet re-entrainment.

4. In the coalescing filter element with double drainage layers, the second outer drainage layer is composed of amphiphobic filter media. The second outer coalescing layer includes a super-amphiphilic layer and a super-amphiphobic layer covering the outside of the super-amphiphilic layer. When the liquid drained from the inner coalescing component drops into the drainage space, the liquid can be absorbed by the second outer coalescing layer and drained from the filter element through the second outer drainage layer in a short time, thus avoiding in liquid accumulation in the liquid drainage space and wetting the inner coalescing component, thereby further preventing droplet re-entrainment and ensuring highly efficient filtration of the coalescing filter element for a long period of time.

BRIEF DESCRIPTION OF THE DRAWINGS

The following drawings are only intended to schematically illustrate and explain the present disclosure, rather than limiting the scope of the present disclosure. In the drawings, FIG. 1 is a structural diagram of a coalescer in the prior art.

FIG. 2 is a structural diagram of a coalescing filter element in the prior art.

FIG. 3 is a cross-sectional view of the coalescing filter element in the prior art along lines C-C of FIG. 2.

DETAILED DESCRIPTION

For a clearer understanding of the technical features, objectives and effects of the present disclosure, specific embodiments of the present disclosure will now be described with reference to the drawings.

Figure 4:
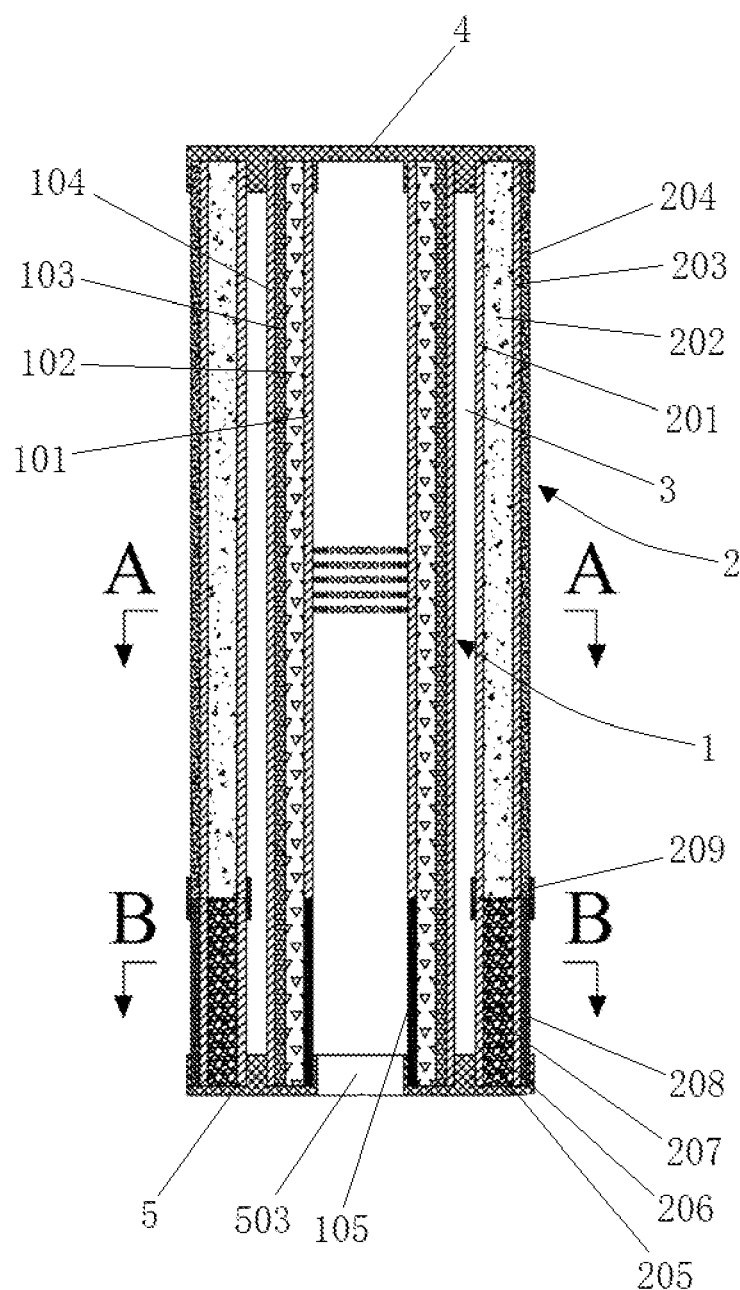
FIG. 4 is a structural diagram of a coalescing filter element with double drainage layers of the present disclosure.

As illustrated in FIG. 4, the present disclosure provides a coalescing filter element with double drainage layers, which includes an inner coalescing component 1 configured to capture a large amount of liquid in gas (i.e., natural gas), and an outer coalescing component 2 configured to coalesce and filter a small amount of liquid remaining in the gas. The inner coalescing component 1 and the outer coalescing component 2 are both cylindrical structures disposed in a vertical direction and opened at two ends. The outer coalescing component 2 is fixedly sleeved on the outer side of the inner coalescing component 1, and an annular drainage space 3 is formed between the inner coalescing component 1 and the outer coalescing component 2. Therefore, the inner coalescing component 1 and the outer coalescing component 2 constitute a double-layer drainage structure. A top end cap 4 is provided on top ends of the inner coalescing component 1 and the outer coalescing component 2 to clog a top opening of the inner coalescing component 1 and the top of the drainage space 3. A bottom end cap 5 is provided on bottom ends of the inner coalescing component 1 and the outer coalescing component 2 to clog the bottom of the drainage space 3. The bottom end cap 5 is provided with a gas inlet 503 communicated with an interior of the inner coalescing component 1, through which the gas can enter the interior of the inner coalescing component 1.

In the present disclosure, positions of the inner coalescing component 1 and the outer coalescing component 2 are fixed by the top end cap 4 and the bottom end cap 5. The gas enters the interior of the inner coalescing component 1 through the gas inlet 503, and then passes through the inner coalescing component 1 and the outer coalescing component 2 in sequence. The inner coalescing component 1 captures a large amount of liquid (about 80% to 90% of the total liquid) in the gas, which greatly reduces the amount of liquid to be coalesced and filtered by the outer coalescing component 2. The outer coalescing component 2 only needs to coalesce and filter a small amount of liquid remaining in the gas, thus effectively avoiding the weakening influence of excessive amount of liquid on filtration performance of the outer coalescing component 2, and effectively prolonging service life of the coalescing filter element and reducing energy consumption.

In addition, since the drainage space 3 is formed between the inner coalescing component 1 and the outer coalescing component 2, the re-entrained droplets from the inner coalescing component 1 will enter the drainage space 3, so as to be fully captured by the drainage space 3 and the outer coalescing component 2, thus further avoiding the weakening influence of excessive amount of liquid on filtration performance of the outer coalescing component 2, thereby significantly improving the filtration efficiency of the coalescing filter element.

Exemplarily, the drainage space 3 has a radial width of 2 mm to 5 mm.

In an alternative embodiment of the present disclosure, as illustrated in FIGS. 4, 7 to 10, the top end cap 4 and the bottom end cap 5 are disc-shaped structures disposed in a horizontal direction. A bottom end surface of the top end cap 4 is provided with an annular first positioning groove 401 and an annular second positioning groove 402 disposed around the first positioning groove 401. A top end surface of the bottom end cap 5 is provided with an annular third positioning groove 501 and an annular fourth positioning groove 502 disposed around the third positioning groove 501. The gas inlet 503 is located at a middle position of the bottom end cap 5. A top portion of the inner coalescing component 1 is fixedly embedded into the first positioning groove 401, and a bottom portion of the inner coalescing component 1 is fixedly embedded into the third positioning groove 501. A top portion of the outer coalescing component 2 is fixedly embedded into the second positioning groove 402, and a bottom portion of the outer coalescing component 2 is fixedly embedded into the fourth positioning groove 502. Therefore, the positions of the inner coalescing component 1 and the outer coalescing component 2 are fixed by the top end cap 4 and the bottom end cap 5, so as to ensure the stability of the overall structure of the coalescing filter element.

In an alternative embodiment of the present disclosure, as illustrated in FIGS. 4 to 6 and 13, the inner coalescing component 1 includes a first inner support 101, an inner coalescing layer, and a second inner support 104. The first inner support 101 and the second inner support 104 are both cylindrical structures disposed in a vertical direction and opened at two ends. The second inner support 104 is fixedly sleeved on the outer side of the first inner support 101, and the inner coalescing layer is interposed between an outer surface of the first inner support 101 and an inner surface of the second inner support 104. The entire second inner support 104 and an upper portion of the first inner support 101 are respectively provided with a plurality of uniformly distributed ventilation holes, through which the gas can pass through the first inner support 101 and the second inner support 104. The inner coalescing layer of the inner coalescing component 1 captures a large amount of liquid in the gas to prevent it from clogging the outer coalescing component 2, so as to improve the coalescence and filtration performance.

Figure 13:
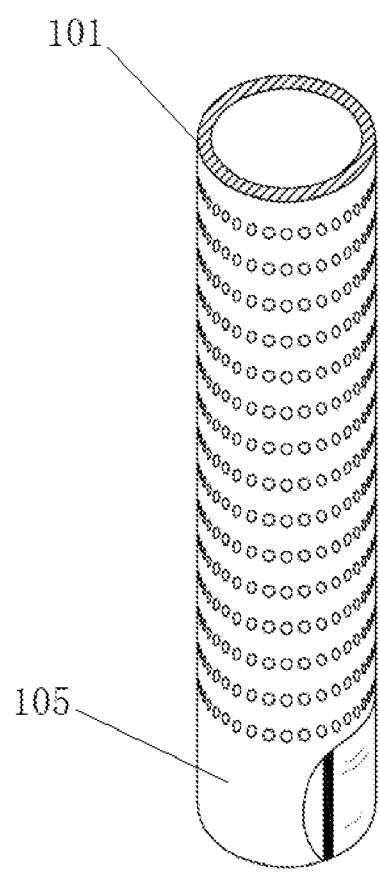
FIG. 13 is a structural diagram of a first inner support in the coalescing filter element with double drainage layers of the present disclosure.

Further, as illustrated in FIGS. 4 and 13, a lower portion of the first inner support 101 is a blocking element 105 with a cylindrical structure and made of a blind plate without ventilation holes. The coalescing filter element in the prior art is mounted in a vertical direction (i.e., an upright mode), so the closer to the bottom of the filter element, the more serious a liquid blockage and droplet re-entrainment in the filter material is. In the embodiment of the present disclosure, by configuring the blocking element 105, the liquid drained from the inner coalescing component 1 all drops into the drainage space 3, or remains at a position in the lower portion of the inner coalescing layer with a same height as the blocking element 105. Therefore, the gas can smoothly pass through the upper portion of the inner coalescing component 1 above the blocking element 105 without directly impacting the liquid in the drainage space 3 and the coalesced and filtered liquid in the lower portion of the inner coalescing layer, thus effectively reducing the droplet re-entrainment.

Further, the blocking element 105 and the first inner support 101 may be, but not limited to, an integral structure.

Exemplarily, a ratio of a height of the blocking element 105 to a height of the inner coalescing component 1 is 1/4 to 1/5.

Figure 5:
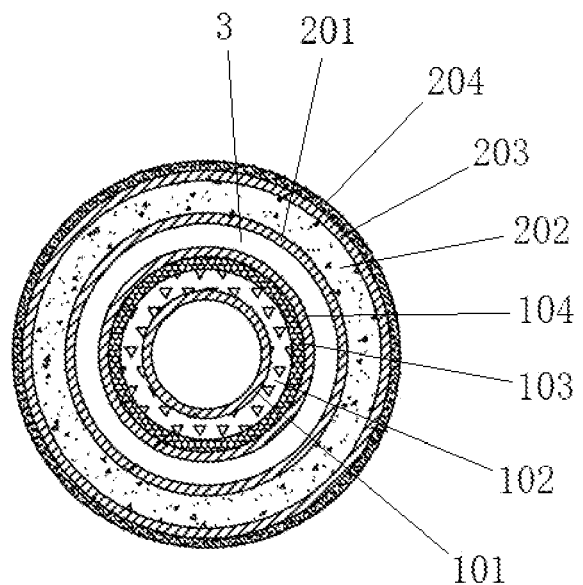
FIG. 5 is a cross-sectional view of the coalescing filter element of the present disclosure along lines A-A of FIG. 4.
Figure 6:
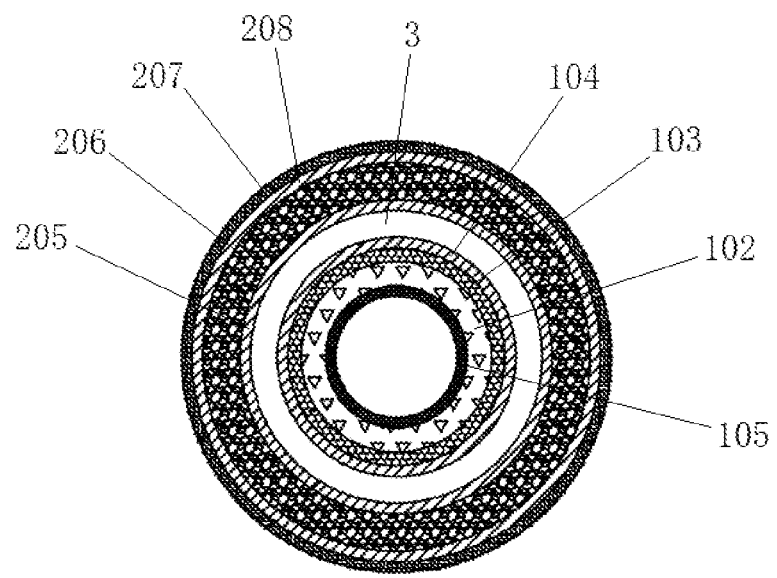
FIG. 6 is a cross-sectional view of the coalescing filter element of the present disclosure along lines B-B of FIG. 4.
Figure 7:
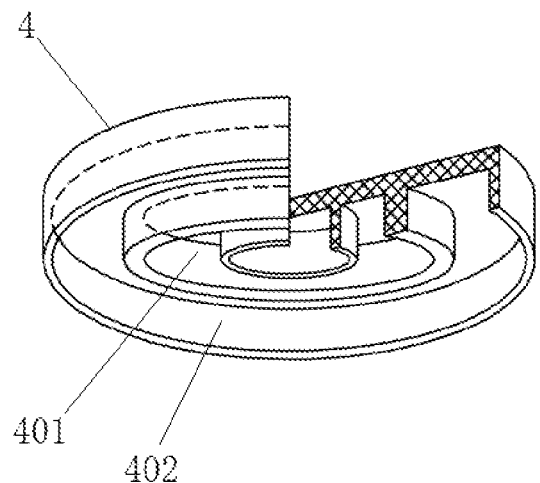
FIG. 7 is a structural diagram of a top end cap in the coalescing filter element with double drainage layers of the present disclosure.
Figure 8:
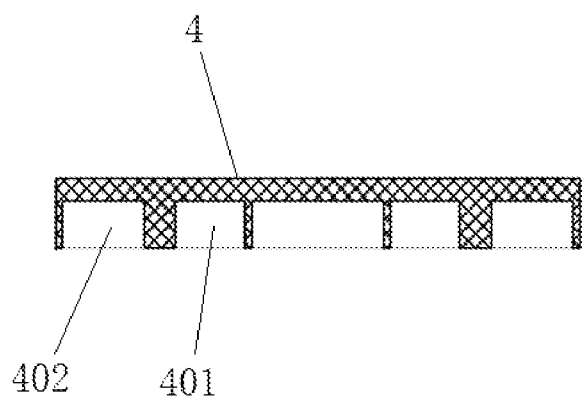
FIG. 8 is a front view of the top end cap in the coalescing filter element with double drainage layers of the present disclosure.
Figure 9:
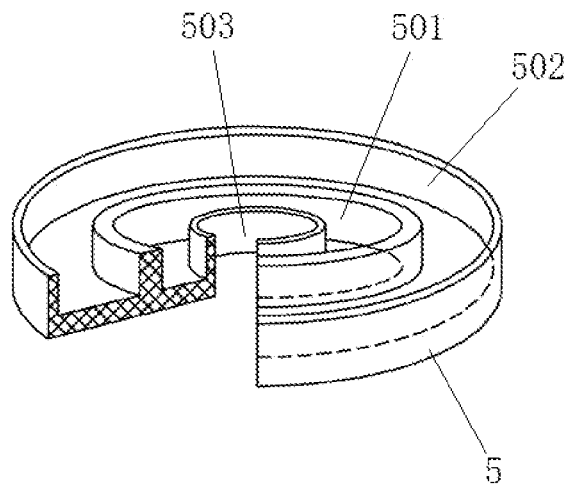
FIG. 9 is a structural diagram of a bottom end cap in the coalescing filter element with double drainage layers of the present disclosure.
Figure 10:
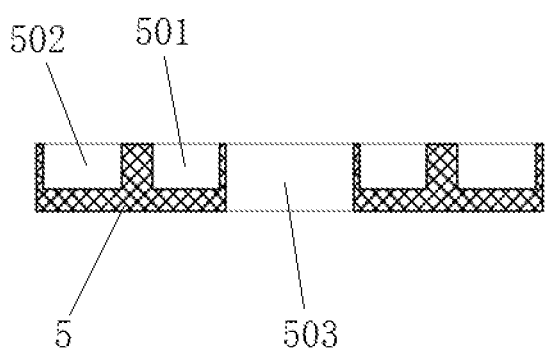
FIG. 10 is a front view of the bottom end cap in the coalescing filter element with double drainage layers of the present disclosure.

In an alternative embodiment of the present disclosure, as illustrated in FIGS. 4 to 6, the inner coalescing layer includes a first inner coalescing layer 102, and an second inner coalescing layer 103 covering an outer surface of the first inner coalescing layer 102. The diameter of filter pores of the first inner coalescing layer 102 is smaller than that of the filter pores of the second inner coalescing layer 103. The first coalescing layer 102 and the second inner coalescing layer 103 have a same wettability to a same liquid. The wettability refers to a degree of wetting of a liquid to filter media, and is usually indicated by a contact angle between the liquid and the filter media. The contact angle less than 90 degrees indicates that the liquid is wettable for the filter media, and the contact angle greater than 90 degrees indicates that the liquid is non-wettable for the filter media.

In the prior art, the coalescing layer of the coalescing filter element is composed of multi-layer high-efficiency fibrous filter media, the average pore diameter of which is about 1 µm to 3 µm. The captured liquid moved to the outer surface of the coalescing layer will form a liquid film and clog the pores of the filter medium, resulting in a sudden increase in the pressure drop of the filter element.

Researches show that the pressure drop caused by the liquid film is mainly influenced by capillary action, and is closely related to the pore diameter of the fibrous filter medium, i.e., the smaller the pore diameter, the greater the pressure drop. In the present disclosure, the inner coalescing layer includes two kinds of filter media, i.e., the first and second inner coalescing layers 102, 103. These two kinds of filter media have the same wettability, and pore diameters of the two kinds of filter media gradually increase from the inside to outside, so that the liquid can smoothly transport from the first inner coalescing layer 102 towards the second inner coalescing layer 103. As there is no difference in wettability and no reduction in flow area, the liquid film will not be formed between the first inner coalescing layer 102 and the second inner coalescing layer 103. The liquid film can only form on an outer surface of the second inner coalescing layer 103 with larger pore diameter.

Exemplarily, the pore diameter of the filter medium of the first inner coalescing layer 102 may be, but not limited to, 3 µm to 6 µm; the pore diameter of the filter medium of the second inner coalescing layer 103 may be, but not limited to, 6 µm to 10 µm. The pore diameter of the second inner coalescing layer 103 is more than two times of that of the high-efficiency fibrous filter medium of the coalescing filter element in the prior art. Compared with the prior art, the first and second inner coalescing layers 102, 103 with larger average pore diameters can reduce the influence of capillary action, thus effectively reducing the pressure drop in the filter element and the power consumption of the filter system.

In an alternative embodiment of the present disclosure, as illustrated in FIGS. 4 and 5, the outer coalescing component 2 includes a first outer support 201, a first outer coalescing layer 202, a second outer support 203, and a first outer drainage layer 204. The first outer support 201 and the second outer support 203 are both cylindrical structures disposed in a vertical direction and opened at two ends. The second outer support 203 is fixedly sleeved on the outside of the first outer support 201, the first outer coalescing layer 202 is interposed between an outer surface of the first outer support 201 and an inner surface of the second outer support 203. The first outer drainage layer 204 covers an outer surface of the second outer support 203. The first outer support 201 and the second outer support 203 are respectively provided with a plurality of uniformly distributed ventilation holes, through which the gas can pass through the first outer support 201 and the second outer support 203. The first outer coalescing layer 202 and the first outer drainage layer 204 cooperate to coalesce and filter the gas, so as to filter out the small amount of liquid remaining in the gas.

Further, the first outer coalescing layer 202 is composed of high-efficiency filter media, and the first outer drainage layer 204 is composed of amphiphobic filter media, which may be, for example, amphiphobic glass fibre filter media, amphiphobic polypropylene fibre filter media, amphiphobic polyester fibre filter media. The pore diameter of the filter media of the first outer coalescing layer 202 is smaller than that of the first outer drainage layer 204. The first outer coalescing layer 202 can coalesce and filter the small amount of liquid in the gas, and the first outer drainage layer 204 can drain the liquid outside the coalescing filter element in a short time.

Optionally, the pore diameter of the filter media of the first outer coalescing layer 202 may be, but not limited to, 1 µm to 3 µm; the pore diameter of the filter media of the first outer drainage layer 204 may be, but not limited to, 20 µm to 40 µm.

In an alternative embodiment of the present disclosure, as illustrated in FIGS. 4 and 6, a third outer support 205 is disposed below the first outer support 201, a second outer coalescing layer 206 is disposed below the first outer coalescing layer 202, a fourth outer support 207 is disposed below the second outer support 203, and a second outer drainage layer 208 is disposed below the first outer drainage layer 204. The third and fourth outer supports 205, 207 are both cylindrical structures disposed in a vertical direction and opened at two ends. The fourth outer support 207 is fixedly sleeved on the outside of the third outer support 205, and the second outer coalescing layer 206 is interposed between an outer surface of the third outer support 205 and an inner surface of the fourth outer support 207. The second outer drainage layer 208 covers an outer surface of the fourth outer support 207. The third and fourth outer supports 205, 207 are respectively provided with a plurality of uniformly distributed ventilation holes, through which the gas can pass through the third and fourth outer supports 205, 207. The second outer drainage layer 208 is composed of amphiphobic filter media, which may be, for example, amphiphobic glass fibre filter media, amphiphobic polypropylene fibre filter media, or amphiphobic polyester fibre filter media. The second outer coalescing layer 206 is composed of media capable of quickly absorbing and draining liquid. The second outer coalescing layer 206 includes a super-amphiphilic layer composed of super-amphiphilic media and a super-amphiphobic layer made of super-amphiphobic media. For example, the super-amphiphilic media may be super-amphiphilic glass fibre filter media, super-amphiphilic polypropylene fibre filter media, or super-amphiphilic polyester fibre filter media, and the super-amphiphobic media may be amphiphobic glass fibre filter media, amphiphobic polypropylene fibre filter media, amphiphobic polyester fibre filter media. The super-amphiphobic layer covers the outside of the super-amphiphilic layer. When the liquid drained from the inner coalescing component 1 drops into the drainage space 3, the liquid can be absorbed by the second outer coalescing layer 206 and transported to the second outer drainage layer 208 in a short time, and then drained from the filter element through the second outer drainage layer 208, thus avoiding in liquid accumulation in the drainage space 3 and wetting the inner coalescing component 1, thereby further preventing droplet re-entrainment and ensuring highly efficient filtration of the first outer coalescing layer 202 and the first outer drainage layer 204 for a long period of time.

Further, the first and second outer coalescing layers 202, 206 in a clean state have basically the same resistance to the passage of gas, so as to ensure that the gas passes through the first and second outer coalescing layers 202, 206 at a same rate, thus improving the filtration efficiency of the coalescing filter element.

Further, the media of the second outer coalescing layer 206 capable of quickly absorbing and draining liquid may be, but not limited to, fiber material. Different wettability (i.e., the super-amphiphilic and the super-amphiphobic layers) on both sides of the second outer coalescing layer 206 may be obtained by performing a solution modification or ion spraying on inner and outer sides of the second outer coalescing layer 206, or by other methods that can make the second outer coalescing layer 206 quickly absorb and drain liquid.

Further, as illustrated in FIG. 4, top end surfaces of the third and fourth outer supports 205, 207, a top end surface of the second outer coalescing layer 206, and a top end surface of the second outer drainage layer 208 are all flush with the top end surface of the blocking element 105. Bottom end surfaces of the third and fourth outer supports 205, 207, a bottom end surface of the second outer coalescing layer 206, and a bottom end surface of the second outer drainage layer 208 are all flush with the bottom end surface of the blocking element 105.

Figure 11:
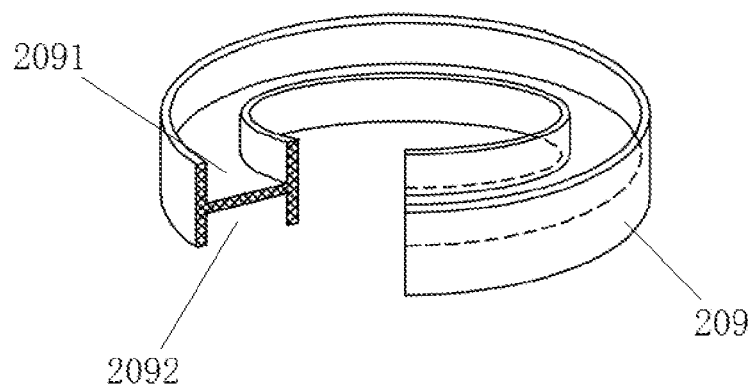
FIG. 11 is a structural diagram of a connecting member in the coalescing filter element with double drainage layers of the present disclosure.
Figure 12:
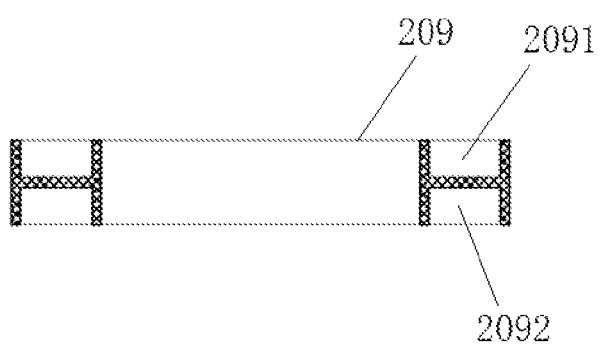
FIG. 12 is a front view of the connecting member in the coalescing filter element with double drainage layers of the present disclosure.

In an alternative embodiment of the present disclosure, as illustrated in FIGS. 4, 11 and 12, the outer coalescing component 2 further includes a connecting member 209, which has a circular structure disposed in a horizontal direction. A top end surface of the connecting member 209 is provided with a circular fifth positioning groove 2091, and a bottom end surface of the connecting member 209 is provided with a circular sixth positioning groove 2092. Bottom portions of the first and second outer supports 201, 203, a bottom portion of the first outer coalescing layer 202, and a bottom portion of the first outer drainage layer 204 are all fixedly embedded into the fifth positioning groove 2091. Top portions of the third and fourth outer supports 205, 207, a top portion of the second outer coalescing layer 206, and a top portion of the second outer drainage layer 208 are all fixedly embedded into the sixth positioning groove 2092. Therefore, the upper and lower portions of the outer coalescing component 2 are fixed by the connecting member 209, so as to ensure that the outer coalescing component 2 has good stability as a whole.

Those described above are just illustrative embodiments of the present disclosure, and are not intended to limit the scope of the present disclosure. Any equivalent change or modification made by a person skilled in the art without departing from the concept and principle of the present disclosure should fall within the scope of the present disclosure.

What is claimed is:

1. A coalescing filter element comprising:
an inner coalescing component for capturing liquid in a gas, and an outer coalescing component for coalescing and filtering the liquid remaining in the gas, wherein
the inner coalescing component and the outer coalescing component are cylindrical structures disposed in a vertical direction;
the outer coalescing component is sleeved on an outer side of the inner coalescing component, and an annular drainage space is formed between the inner coalescing component and the outer coalescing component;
a top end cap is provided on top ends of the inner coalescing component and the outer coalescing component;
a bottom end cap is provided on bottom ends of the inner coalescing component and the outer coalescing component, and the bottom end cap is provided with a gas inlet communicated with an interior of the inner coalescing component;
the inner coalescing component comprises a first inner support, an inner coalescing layer, and a second inner support; the second inner support is sleeved on an outer side of the first inner support, and the inner coalescing layer is interposed between an outer surface of the first inner support and an inner surface of the second inner support; the second inner support and an upper portion of the first inner support are respectively provided with a plurality of uniformly distributed ventilation holes, and a lower portion of the first inner support is a blocking element with a cylindrical structure;
the outer coalescing component comprises a first outer support, a first outer coalescing layer, a second outer support, and a first outer drainage layer; the second outer support sleeves on an outside of the first outer support, and the first outer coalescing layer is interposed between an outer surface of the first outer support and an inner surface of the second outer support; the first outer drainage layer covers an outer surface of the second outer support; the first outer support and the second outer support are respectively provided with a plurality of uniformly distributed ventilation holes; and
a third outer support is disposed below the first outer support, a second outer coalescing layer is disposed below the first outer coalescing layer, a fourth outer support is disposed below the second outer support, and a second outer drainage layer is disposed below the first outer drainage layer; the fourth outer support is sleeved on an outside of the third outer support, and the second outer coalescing layer is interposed between an outer surface of the third outer support and an inner surface of the fourth outer support; the second outer drainage layer covers an outer surface of the fourth outer support.

2. The coalescing filter element of claim 1, wherein the inner coalescing layer comprises a first inner coalescing layer and a second inner coalescing layer which have a same wettability to a same liquid;
the second inner coalescing layer covers the outside of the first inner coalescing layer;
a diameter of filter pores of the first inner coalescing layer is smaller than that of filter pores of the second inner coalescing layer.

3. The coalescing filter element of claim 1, wherein the first outer coalescing layer is composed of high-efficiency filter media, the first outer drainage layer is composed of amphiphobic filter media, and a pore diameter of filter pores of the first outer coalescing layer is smaller than that of filter pores of the first outer drainage layer.

4. The coalescing filter element of claim 1, wherein
top end surfaces of the third outer support and the fourth outer support, a top end surface of the second outer coalescing layer, and a top end surface of the second outer drainage layer are flush with a top end surface of the blocking element;
bottom end surfaces of the third outer support and the fourth outer support, a bottom end surface of the second outer coalescing layer, and a bottom end surface of the second outer drainage layer are flush with a bottom end surface of the blocking element.

5. The coalescing filter element of claim 1, wherein the outer coalescing component further comprises a connecting member having a top end surface provided with a circular fifth positioning groove and a bottom end surface provided with a circular sixth positioning groove;
bottom portions of the first outer support and the second outer support, a bottom portion of the first outer coalescing layer, and a bottom portion of the first outer drainage layer are embedded into the fifth positioning groove;
top portions of the third outer support and the fourth outer support, a top portion of the second outer coalescing layer, and a top portion of the second outer drainage layer are embedded into the sixth positioning groove.

6. The coalescing filter element of claim 1, wherein a bottom end surface of the top end cap is provided with an annular first positioning groove and an annular second positioning groove disposed around the first positioning groove;
a top portion of the inner coalescing component is embedded into the first positioning groove, and a top portion of the outer coalescing component is embedded into the second positioning groove.

7. The coalescing filter element of claim 1, wherein the gas inlet is located at a middle position of the bottom end cap;
a top end surface of the bottom end cap is provided with an annular third positioning groove and an annular fourth positioning groove disposed around the third positioning groove;
a bottom portion of the inner coalescing component is embedded into the third positioning groove, and a bottom portion of the outer coalescing component is embedded into the fourth positioning groove.

8. The coalescing filter element of claim 1, wherein the first outer coalescing layer is composed of high-efficiency filter media, the first outer drainage layer is composed of amphiphobic filter media, and a pore diameter of filter pores of the first outer coalescing layer is smaller than that of filter pores of the first outer drainage layer.

9. A coalescing filter element, comprising:
an inner coalescing component and an outer coalescing component, wherein
the inner coalescing component and the outer coalescing component are cylindrical structures disposed in a vertical direction;
the outer coalescing component is sleeved on an outer side of the inner coalescing component, and an annular drainage space is formed between the inner coalescing component and the outer coalescing component;
a top end of the inner coalescing component and a top end of the outer coalescing component are closed, a bottom end of the annular drainage space is closed, and a bottom end of an interior of the inner coalescing component is provided with a gas inlet;
the outer coalescing component comprises a first outer support, a first outer coalescing layer, a second outer support, and a first outer drainage layer; the second outer support sleeves on an outside of the first outer support, and the first outer coalescing layer is interposed between an outer surface of the first outer support and an inner surface of the second outer support; the first outer drainage layer covers an outer surface of the second outer support; the first outer support and the second outer support are respectively provided with a plurality of uniformly distributed ventilation holes; and
a third outer support is disposed below the first outer support, a second outer coalescing layer is disposed below the first outer coalescing layer, a fourth outer support is disposed below the second outer support, and a second outer drainage layer is disposed below the first outer drainage layer; the fourth outer support is sleeved on an outside of the third outer support, and the second outer coalescing layer is interposed between an outer surface of the third outer support and an inner surface of the fourth outer support; the second outer drainage layer covers an outer surface of the fourth outer support.

10. The coalescing filter element of claim 9, wherein the inner coalescing component comprises a first inner support, an inner coalescing layer, and a second inner support;
the second inner support is sleeved on an outer side of the first inner support, and the inner coalescing layer is interposed between an outer surface of the first inner support and an inner surface of the second inner support;
the second inner support and an upper portion of the first inner support are respectively provided with a plurality of uniformly distributed ventilation holes, and a lower portion of the first inner support is a blocking element with a cylindrical structure.

11. The coalescing filter element of claim 10, wherein the inner coalescing layer comprises a first inner coalescing layer and a second inner coalescing layer which have a same wettability to a same liquid;
the second inner coalescing layer covers the outside of the first inner coalescing layer;

a diameter of filter pores of the first inner coalescing layer is smaller than that of filter pores of the second inner coalescing layer.

\* \* \* \* \*